(12) United States Patent
Ashcraft et al.

(10) Patent No.: US 7,375,894 B2
(45) Date of Patent: May 20, 2008

(54) COMMON LENS HELMET MOUNTED DISPLAY

(75) Inventors: Todd Ashcraft, Aurora, IL (US); Kenneth Scott Ellis, Tucson, AZ (US); Richard Nicholas Pfisterer, Tucson, AZ (US)

(73) Assignee: Gentex Corporation, Carbondale, PA (US)

( * ) Notice: Subject to any disclaimer, the term of this patent is extended or adjusted under 35 U.S.C. 154(b) by 0 days.

(21) Appl. No.: 11/370,088

(22) Filed: Mar. 7, 2006

(65) Prior Publication Data

US 2007/0211348 A1    Sep. 13, 2007

(51) Int. Cl.
G02B 27/10 (2006.01)
G09G 5/00 (2006.01)
H04N 7/00 (2006.01)

(52) U.S. Cl. ............ 359/627; 345/8; 348/115

(58) Field of Classification Search ........ 359/462, 359/466, 618, 619, 603–636, 638–639, 404, 359/407, 409–410; 349/11; 345/7–9; 348/115
See application file for complete search history.

(56) References Cited

U.S. PATENT DOCUMENTS

| | | | |
|---|---|---|---|
| 3,670,097 A | 6/1972 | Jones | |
| 3,990,087 A | 11/1976 | Marks et al. | |
| 4,458,990 A | 7/1984 | Kawai | |
| 4,897,715 A * | 1/1990 | Beamon, III | 348/115 |
| 5,005,956 A | 4/1991 | Kaneda et al. | |
| 5,129,716 A | 7/1992 | Holakovszky et al. | |
| 5,166,778 A | 11/1992 | Beamon, III | |
| 5,299,063 A | 3/1994 | Fritz et al. | |
| 5,455,649 A | 10/1995 | Yamada et al. | |
| 5,646,784 A | 7/1997 | Wilson | |
| 5,715,094 A | 2/1998 | Ansley et al. | |
| 5,926,318 A | 7/1999 | Herbert | |
| 6,008,939 A | 12/1999 | Herbert | |
| 6,040,946 A | 3/2000 | Herbert | |
| 6,246,383 B1 * | 6/2001 | Ophey | 345/8 |

(Continued)

FOREIGN PATENT DOCUMENTS

EP   0 722 109 A1    7/1996

(Continued)

OTHER PUBLICATIONS

Sisodia et al., "Design of an Advanced Helmet Mounted Display (AHMD)", Proceedings of the SPIE, vol. 5801, pp. 304-315; 2005.

(Continued)

Primary Examiner—Scott J. Sugarman
Assistant Examiner—DaWayne A Pinkney
(74) Attorney, Agent, or Firm—Keusey, Tutunjian & Bitetto, P.C.

(57) ABSTRACT

A common lens HMD is shown and described. The use of a common lens in a biocular or binocular helmet mounted display (HMD) system provides a means to manipulate light rays from an image(s) which are traveling from two or more separate upstream optics trains to the helmet visor and onward to each eye, with fields of view which overlap at the midpoint of the visor. The common lens changes the optical paths of each individual ray going to a single eye, and changes the corresponding ray traveling to the other eye in a mirrored fashion (i.e. with the opposite component in the Left/Right direction).

30 Claims, 6 Drawing Sheets

U.S. PATENT DOCUMENTS

| | | |
|---|---|---|
| 6,747,802 B2 | 6/2004 | Bignolles et al. |
| 6,989,935 B2 | 1/2006 | Domjan et al. |
| 7,057,824 B2 * | 6/2006 | Domjan et al. ............. 359/630 |
| 2004/0165284 A1 * | 8/2004 | Holler ........................ 359/805 |

FOREIGN PATENT DOCUMENTS

| | | |
|---|---|---|
| EP | 0 834 760 B1 | 12/2002 |
| WO | WO 2004/086771 A2 | 10/2004 |
| WO | WO 2004/086771 A3 | 10/2004 |

OTHER PUBLICATIONS

Kruk et al., "Binocular Overlap in a Fiber Optic Helmet Mounted Display", AF Human Resources Lab., The IMAGE 3 Conf. Proc. pp. 363-378, 1984.

Bunkenburg, et al., "Innovative Diffractive Eyepiece for a Helmet-mounted Display", Proc. SPIE, vol. 3430, pp. 41-49; Dec. 1998.

George C. Bull, "Helmet Mounted Display with Multiple Image Sources" Proceedings of the SPIE, vol. 1695 pp. 38-46; Oct. 1992.

* cited by examiner

COMMON LENS HELMET MOUNTED DISPLAY

BACKGROUND OF THE INVENTION

1. Field of the Invention

The present invention relates to helmet mounted displays (HMDs). More particularly, it relates to the use of a common lens in a biocular or binocular HMD.

2. Description of the Prior Art

Helmet mounted displays (HMDs) are a class of image display devices that can be used to display images for military and/or recreational applications. An HMD can be monocular, biocular or binocular. HMD systems which are biocular or binocular must, by definition, supply one or more images to the two eyes of the user. In doing so, these systems make use of a partially reflective surface, usually in the form of a visor or a combiner element positioned in front of the eyes. Optics trains comprised of mirrors, lenses, and other elements of the HMD are used to manipulate the light rays and the bundles of light rays which comprise the optical field, so as to project images from an image source to the eye(s) in a manner which appears undistorted to the user.

The optical system (i.e., optics trains) of the HMD is of integral importance when designing the helmet and corresponding visor systems. This is primarily due to the fact that the HMD is mounted directly to the helmet of the wearer. In addition, the location of the HMD mounted on the helmet depends on the display surface on which the HMD is to project its images. The positioning of this added mass on the exterior surface of the helmet can have a negative effect on the wearer depending on the location of the same. In the present case, the helmet visor is the surface on which the HMD is to project its image. As such, the HMD optics trains and their location are dependent on the helmet visor and its physical and optical properties, along with the positioning of the same with respect to the user's eyes.

Generally HMD optics trains adapted to project images on a helmet are mounted on the left and right sides of the exterior surface of the helmet at a level that is substantially aligned with the level of the wearer's eyes. See for example, U.S. Pat. No. 5,299,063. In this example, the mounting of the HMD on the sides of the helmet, and furthest away from the centerline of the helmet will result in a greater increase of the moment of inertia (MOI) for the combination of HMD and helmet, and as such, can pose an increased risk of neck strain or injury to the wearer.

It is apparent from the foregoing that the overall mass of the HMD optics trains and the positioning of the same on the helmet are integral to the performance of the same and the wearer. Thus, there is a need for an HMD system that provides a more compact HMD optics train that has a decreased overall mass compared to that of existing systems, and can be positioned on the helmet so as to minimize the increase in the moment of inertia associated with the added mass to the exterior surface of the helmet.

SUMMARY OF THE INVENTION

It is therefore an aspect of the present concepts to improve existing HMD systems by reducing the overall mass of the HMD optics trains, while enabling a more strategic positioning of the same to minimize the moment of inertia of the combined helmet and HMD system.

These and other aspects are achieved in accordance with the present concepts, wherein the helmet mounted display (HMD) system includes a first optics train for generating light ray bundles traveling along a first optical path, a second optics train for generating light ray bundles traveling along a second optical path, and a common lens shared between the first and second optics trains. The common lens is positioned to receive the light ray bundles traveling along the first and second optical paths prior to a crossing of the optical paths, and redirect them to a helmet projection surface for display to a wearer of the helmet. The common lens may include an optical element for each of the light ray bundles.

The common lens is preferably positioned and oriented to impart changes to the optical properties of the two crossing light ray bundles in a manner which allows the reorientation, repositioning and/or resizing of upstream optical elements. According to one preferred aspect of the present concepts, the common lens is positioned such that it is out of field of view of the user, and thus does not obstruct the user's view or interfere with their operation while wearing a helmet with the HMD of the present invention.

According to one aspect of the invention, there can be more than two optics trains generating more than two light ray bundles traveling along corresponding optical paths. The common lens is shared between the more than two optics trains.

According to a further aspect of the invention, the helmet mounted display (HMD) system includes at least one optics train generating at least two light ray bundles traveling along at least one optical path, a common lens positioned to received the at least two light ray bundles and redirect the same to a helmet projection surface for display to a wearer of the helmet, and an adjustment mechanism connected to said common lens for enabling adjustment of an image impact point on the helmet projection surface.

The common lens is positioned and oriented to impart changes to the optical properties of the at least two light ray bundles in a manner which allows the reorientation, repositioning and/or resizing of upstream optical elements within said at least one optics train.

According to yet a further aspect of the invention, the helmet mounted display (HMD) system includes a first optics train for generating light ray bundles traveling along a first optical path, a second optics train for generating light ray bundles traveling along a second optical path; and a common lens shared between the first and second optics trains and positioned to receive the light ray bundles traveling along the first and second optical paths and redirect them to a helmet visor for display to a wearer of the helmet.

Other aspects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings wherein like reference numerals denote similar components throughout the views.

DETAILED DESCRIPTION OF PREFERRED EMBODIMENTS

As mentioned above, the optics trains of the HMD systems are generally comprised of mirrors, lenses, and other elements that are used to manipulate the light rays and the bundles of light rays which comprise the optical field (i.e., field of view), so as to project images from an image source(s) to the eyes in a manner which appears undistorted to the user.

Since the image ray bundles (and hence the optical paths of the same) generally cross at least once in this type of HMD design, a shared or common optical element located at or near the bundle crossing points has the ability to redirect these rays into a tighter bundle, or to collect more than one bundle into a smaller area. The tighter bundle or smaller overall group of multiple bundles requires a smaller optical element to pass through (i.e. a smaller aperture), and as such, the optics upstream and/or downstream of the common elements may be reduced in size.

It is the reduction in size of the optical elements that enables the same to be positioned nearer each other (e.g., closer to the centerline of the helmet) or closer to other helmet mounted components (e.g., night vision, etc).

Lastly, because the angle of divergence and area are interrelated in optical designs, the introduction of a common lens has the same effects over field angles as described for field areas. Thus, optical power in the adjacent optics may also be reduced through the use of a common lens.

Figure 1:
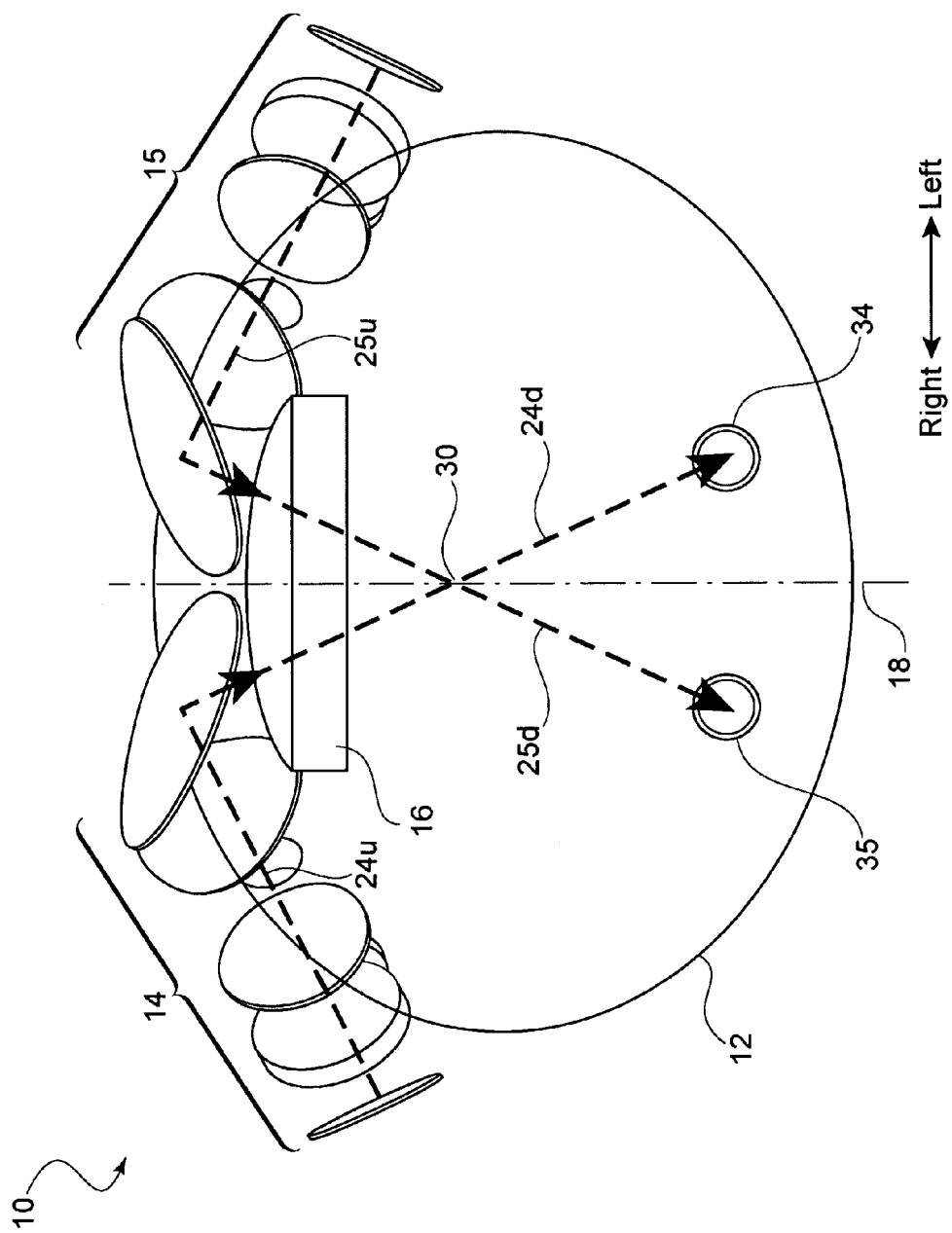
FIG. 1 is a front schematic view of the common lens HMD system according to an embodiment of the present concepts.
Figure 2:
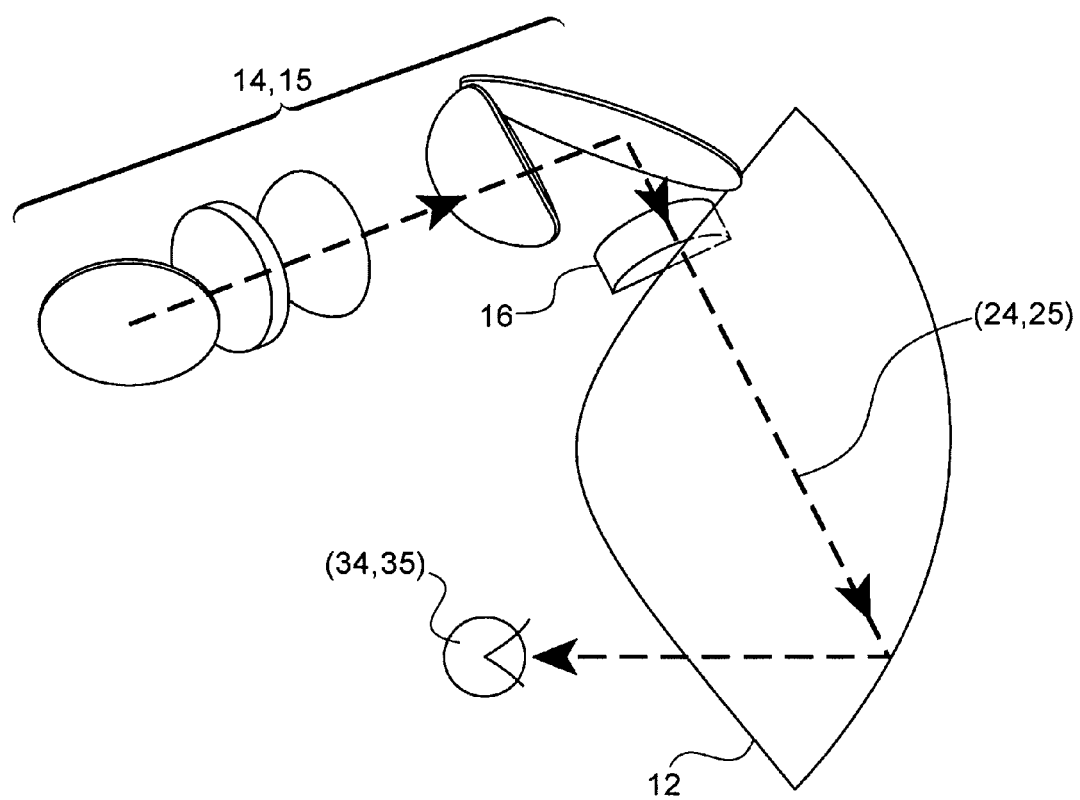
FIG. 2 is a side schematic view of the common lens HMD system according to an embodiment of the present concepts.
Figure 5:
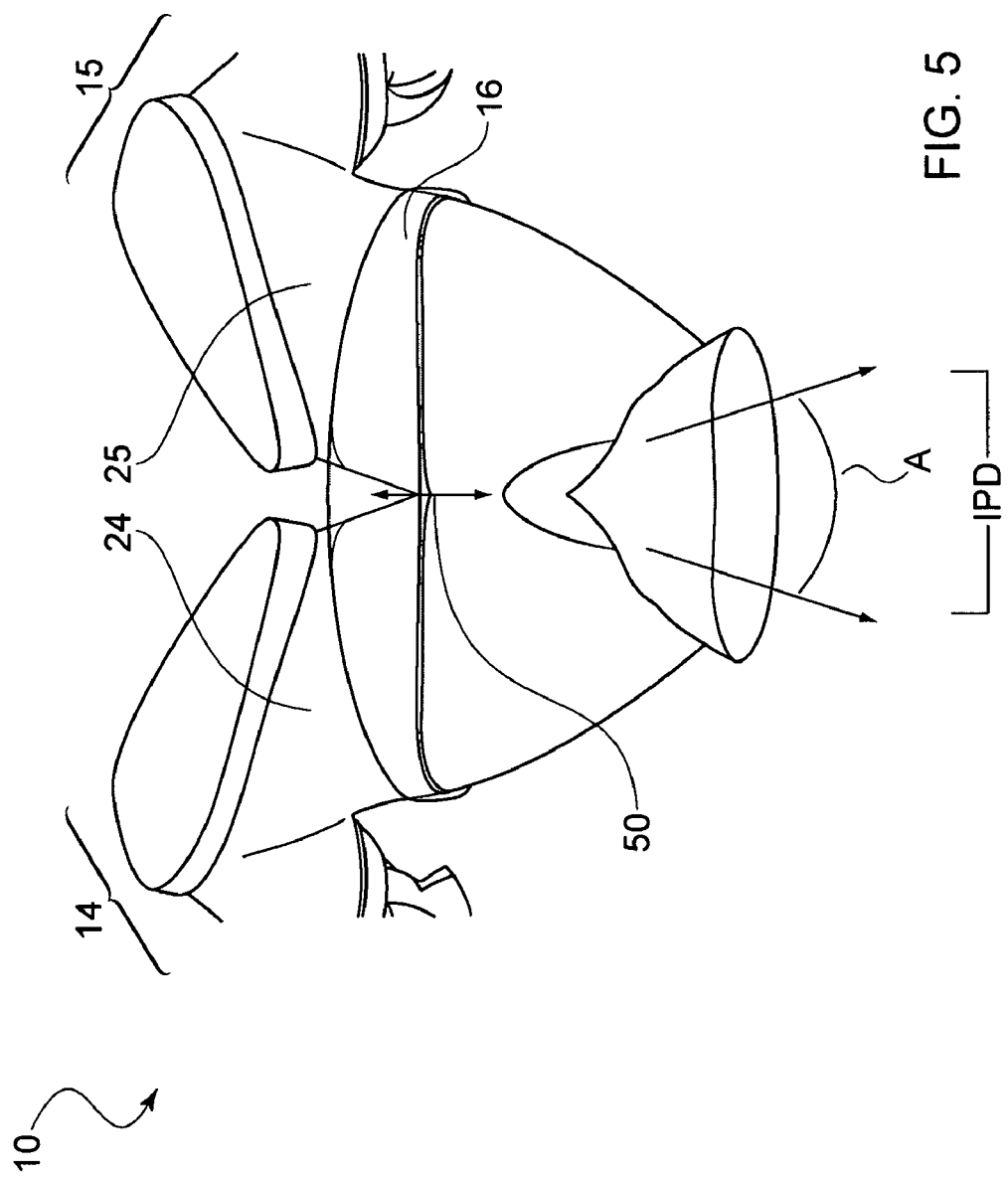
FIG. 5 is a schematic view of the common lens HMD system according to yet a further embodiment of the present concepts.

Referring to FIGS. 1 and 2, there is shown the common lens HMD system 10 according to the present principles. As shown, the HMD includes an optical system 14, 15 for each eye of the wearer and a lens 16 common to both optical systems 14 and 15. Each optical system 14, 15 includes a plurality of optical elements (e.g., lenses, mirrors, etc) that make up the optics trains of each optical system 14, 15 (hereinafter interchangeably referred to as optics trains 14, 15). The images' light rays (or bundles) 24, 25 are emitted from the optics trains 14, 15, respectively, and pass through the common lens 16 to the helmet projection surface 12 (e.g., the helmet visor) and onward to each eye 34, 35 of the user. The field of view (FOV) of the downstream light rays 24d, 25d overlap at the midpoint 18 of the projection surface/visor 12. In accordance with the present concepts, the projection surface 12 can be the helmet visor by itself, or the helmet visor with a combiner. The point of impact of the light ray bundles generated by the optics trains on the projection surface 12 may be controlled by adjusting 50 the common lens 16, as shown in FIG. 5. By way of example, a simple mechanical lens translation device can be used with common lens 16 to adjust the point of impact A of the image onto the projection surface 12.

The addition of common lens 16 reduces the mass of the HMD optics trains 14, 15 by reducing the lens quantity and total lens area. Furthermore, the common lens design of the present concepts results in a reduction in the area and complexity of the lenses within each of the optics trains 14, 15 upstream of the common lens 16. This reduction is a result of the tightening of the upstream light ray bundles 24u, 25u through optical power in the common lens 16. By increasing the optical power in the common lens 16, the upstream ray bundles 24u, 25u are allowed to expand at the common lens 16 to fill the required field of view for each eye 34, 35 on the visor 12, rather than maintaining large area elements throughout the optical paths of optics trains 24, 25.

As mentioned above, the addition of the common lens enables a reduction in the overall mass of the upstream optics trains. This reduction in mass of the optics trains can be attributable to, for example: 1) decrease in the size of the optics making up the optics train; and/or 2) a reduction in the actual number of optical elements that make up the optics trains.

Figure 3:
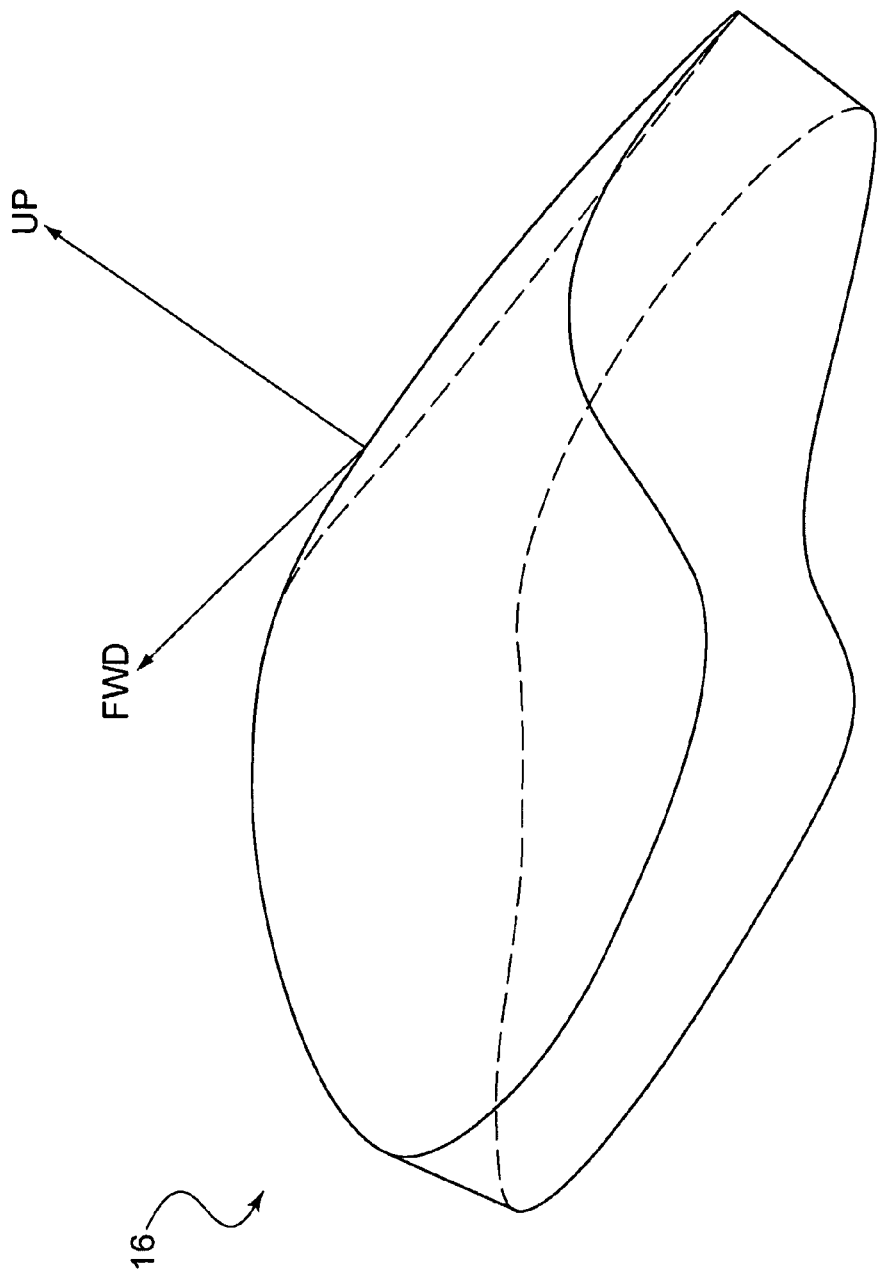
FIG. 3 is a perspective view of a common lens element according to an embodiment of the present principles.

FIG. 3 shows an example of what common lens 16 may look like according to one aspect of the present principles. Those of skill in the art will recognize that the type and configuration of the surface of common lens 16 can be varied according to the desired optical properties of the same. For example, the surfaces of common lens 16 may be planar, convex, concave, or any other suitable surface configuration.

Referring to FIG. 3, the common lens 16 can be a single optical element or can be a single part having multiple optical elements. By way of example, the common lens 16 can include, for example, two or more separate optical elements. In this embodiment, the FOV boundaries for the light ray bundles may not necessarily overlap after being projected onto the visor or other projection surface. It is likely that these boundaries would overlap where they cross exiting the common lens 16. As such, more than one optical element can be combined into common lens 16 for one or more light bundles received thereby to further reduce the mass of the HMD and/or optics trains of the same. Those of skill in the art will recognize that the shape and form of the common lens 16 can be varied to optimize the optics of the HMD. For example, the common lens can be selected and implemented to optimize the particular optics trains being used with the HMD for one or more specific applications.

Figure 4:
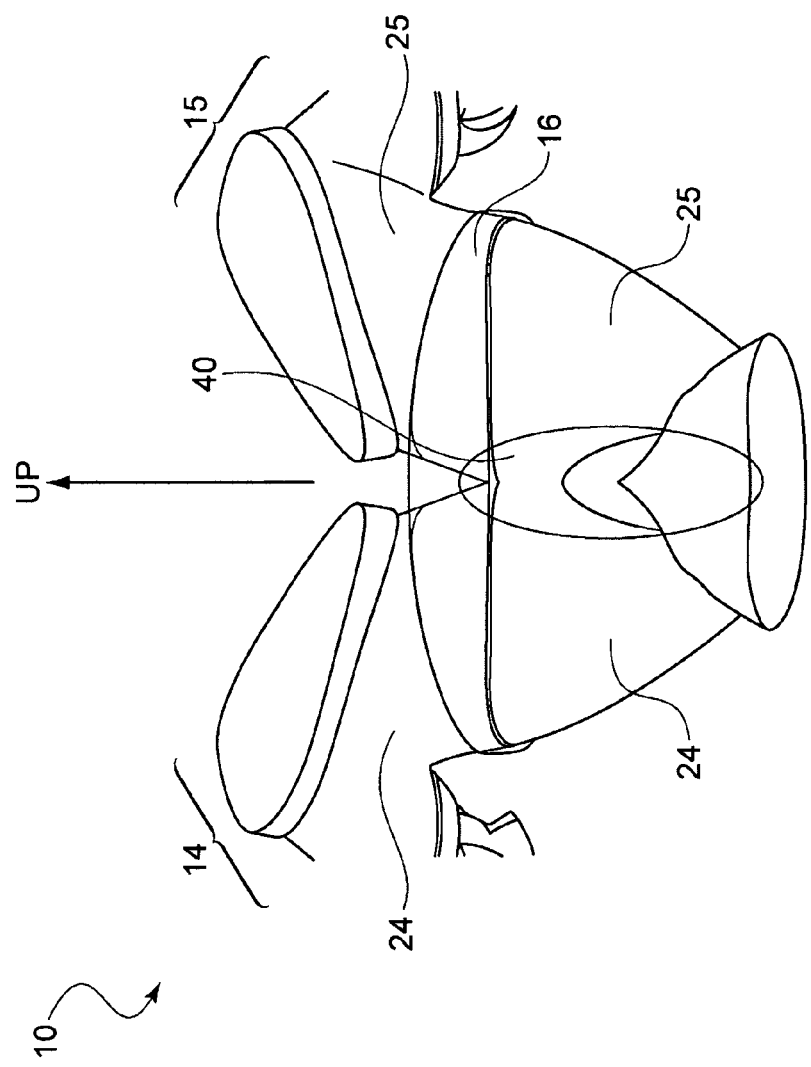
FIG. 4 is a schematic view of the common lens HMD system according to another embodiment of the present concepts.

FIG. 4 shows an example of the common lens HMD system 10 according to an aspect of the present concepts. The common lens 16 is positioned so as to create a bundle overlap area 40 where the light bundles 24 and 25 generated by the optics trains 14 and 15, respectively, overlap as they travel toward the visor. The incorporation of the common lens 16 increases the size of the bundle overlap area 40 and thereby saves valuable area in the HMD system.

Common lens 16 is preferably disposed at or near the point 30 where the downstream light rays 24d, 25d cross after exiting the optical trains 14, 15, respectively, and before the visor 12. By disposing common lens 16 as shown and described, its position effectively moves the location of the required divergence between the two ray paths 24, 25 toward the visor 12 along the optical path, and thus allows the upstream optics trains 14, 15 to move lower and nearer each other, and near the eyes 34, 35. This reduces the overall mass properties of the HMD and also results in a lower moment of inertia (MOI).

By including the common lens 16 at a location where the overall ray bundle areas are more consolidated, (i.e., near the crossing point of the two ray paths 24, 25), the upstream optics trains 14, 15 can be located closer to the centerline of the helmet (not shown), thereby decreasing the moment of inertia and overall structural mass of the helmet. For purpose of clarification, the term "upstream", as used herein, refers to anything that comes before the common lens in the optical realm. For example, the optics contained in optics trains 14 and 15 are considered upstream of the common lens 16, and the light ray bundles generated by the optics trains 14 and 15 are considered upstream prior to entering common lens 16.

As mentioned above, the addition of the common lens 16 enables a reduction in mass of the HMD optics trains 14, 15. It will be apparent that this reduction in mass, alone, has the effect of reducing the moment of inertia (MOI) of the combination, regardless of the actual position of the optics train on the helmet. For example, referring to FIG. 6, a prior art optics train 64 is shown mounted on the helmet 60 substantially at eye level 62, while an optics train 66, in accordance with the present concepts, is also shown at the same position. By simply replacing the prior optics train 64 with a smaller (reduced mass) optics train 66 and disposing a common lens 16 (not shown in FIG. 6), as shown and described throughout this disclosure, the MOI for the eye level position mounting 62 is clearly reduced as a direct effect of the reduction in mass of the optics train.

Figure 6:
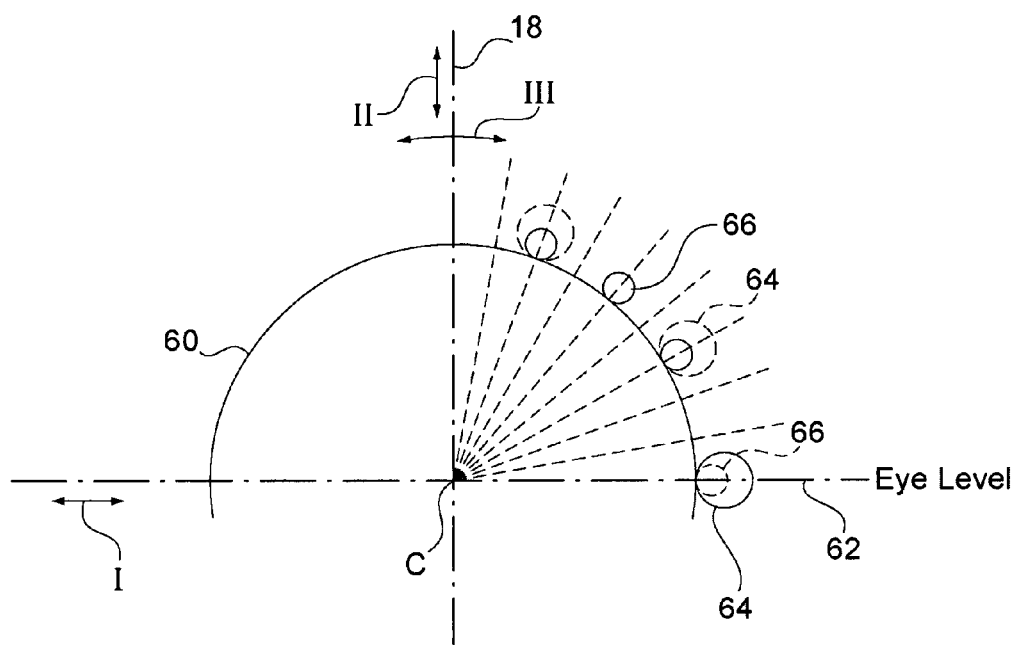
FIG. 6 is a diagrammatic representation of the present concepts from a moment of inertia (MOI) perspective.

Another important consideration in MOI reduction is what type of MOI is being reduced. Generally, there are three types of MOI. By way of example, FIG. 6 shows these three (3) MOIs I, II and III. The first MOI "I" is a left-to-right movement of the user's head about the center line 18 of the helmet. The second MOI "II" is the forward and rearward (or nodding) movement of the user's head along center line 18 and about a point that is generally situated at the user's neck (not shown). The third MOI "III" is referred to herein as the side-to-side movement of the user's head about a pivot point that is generally located in the user's neck. This pivot point in the user's neck is generally located below the center point C where there center line 18 and the eye level line 62 cross. Of the three movements described, the left-to-right movement of the user's head constitutes the greatest movement. The present concepts potentially provide the most benefit in reducing the MOI in this axis.

By reducing the overall mass of the optics trains, and adding the common lens to the helmet at a point that is centrally located (i.e., substantially disposed symmetrically to the center line 18) and lowering it by not positioning the same on the helmet surface, the center of gravity (CG) of the combination is lowered, compared to the CG when using prior art optics trains without a common lens. In addition, by reducing the overall mass of the optics trains and positioning the common lens 16 as shown and described, there is no increase in MOI. A decrease in MOI may also be experienced as a result of the lowering of the CG that results from the disposition of the common lens and reduced mass optics trains as proposed by the present concepts.

The examples shown in FIG. 6 show that the smaller, reduced mass, optics train 66 of the present concepts, can be positioned anywhere on the helmet surface and will result in an improved (or reduced) MOI compared to that of the prior arts optics train 64. Furthermore, the reduced mass optics train 66 may enable the positioning of the same on the helmet that would otherwise not be possible with the larger, increased mass, prior art optics train 64.

Those of skill in the art will recognize the center of gravity (CG) of the helmet is another consideration when it comes to moving the optics trains closer to the centerline 18 of the helmet 60. Thus, as the optics trains are moved closer to the centerline 18 of the helmet, the CG is inherently raised, which is clearly not preferred. However, by reducing the overall mass of the optics trains, as proposed by the present concepts, they can be moved upward along the helmet surface toward the centerline 18 without affecting the CG to a point where it is undesirable. It will be further recognized that certain applications may require the optics trains to be mounted closer to eye level, while others may prefer a mounting closer to the centerline or top of the helmet. When different configurations are required, those of skill in the art will also recognize that a balance must be made between the potential increase in vertical CG resulting from moving the optics train upward toward the centerline, and the potential reduction in MOI as a function of this same movement.

Those of skill in the art of optical design will recognize that various methods and/or adjustment systems may be employed for common lens 16. Examples of such adjustment can include, but may not be limited to, mechanical or electro-mechanical lens adjustment systems. These types of optical element translation, rotation or tilt adjustment systems are well known in the art and can include, for example, fine threaded adjustment barrels at the lens mounting locations, simple shims, and/or wedge/ramp features with micro-adjustment slides. Mechanical and electro-mechanical lens adjustment systems are common used and well known in the art. Examples of such systems are disclosed by U.S. Pat. Nos. 4,458,990, 5,005,956 and 5,455,649, which are hereby incorporated herein by reference.

While there have been shown, described and pointed out fundamental novel features of the invention as applied to preferred embodiments thereof, it will be understood that various omissions, substitutions and changes in the form and details of the methods described and devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed, described or suggested form or embodiment as a general matter of design choice. It is the intention, therefore, to be limited only as indicated by the scope of the claims appended hereto.

What is claimed is:

1. A binocular helmet mounted display (HMD) system comprising:
   a helmet having a helmet protection surface; and
   a helmet mounted display disposed within the helmet and including:
   (i) a first image source and optics train including lenses for projecting light ray bundles of a first image source along a first optical path;
   (ii) a second image source and optics train including lenses for projecting light ray bundles of a second, different image source along a second optical path; and
   (iii) a common lens shared between said first and second optics trains and positioned to receive image-bearing light ray bundles traveling along said first and second optics trains, wherein said common lens directs said paths different image-bearing light ray bundles so that they cross each other upon exiting said optics trains before impinging in said helmet projection surface for display to a wearer of the helmet.

2. The helmet mounted display according to claim 1, wherein said common lens is positioned and oriented to impart changes to the optical properties of the two crossing light ray bundles in a manner which allows the reorientation, repositioning and/or resizing of upstream optical elements.

3. The helmet mounted display according to claim 1, further comprising more than two optics trains generating more than two light ray bundles traveling along corresponding optical paths, said common lens being shared between the more than two optics trains.

4. The helmet mounted display according to claim 1, wherein said common lens further comprises an optical element for each of said light ray bundles.

5. The helmet mounted display according to claim 3, wherein said common lens further comprises an optical element for each of said more than two light ray bundles.

6. The helmet mounted display according to claim 1, further comprising an adjustment mechanism connected to said common lens for enabling adjustment of an image impact point on the helmet projection surface.

7. The helmet mounted display according to claim 6, wherein the helmet projection surface includes a combiner.

8. The helmet mounted display according to claim 6, wherein the helmet projection surface is a helmet visor.

9. The helmet mounted display according to claim 8, wherein the visor includes a combiner.

10. The helmet mounted display according to claim 1, wherein the helmet projection surface includes a combiner.

11. The helmet mounted display according to claim 1, wherein the helmet projection surface is a helmet visor.

12. The helmet mounted display according to claim 11, wherein the visor includes a combiner.

13. The helmet mounted display according to claim 1, wherein said common lens includes at least one optical element.

14. The helmet mounted display according to claim 13, wherein said helmet projection surface includes a combiner.

15. The helmet mounted display according to claim 13, wherein said helmet projection surface is a helmet visor.

16. The helmet mounted display according to claim 15, wherein the visor includes a combiner.

17. A binocular helmet mounted display (HMD) system comprising:
a helmet and an HMD mounted in said helmet, said HMD including:
(i) a first image source and optics train including lenses for projecting light ray bundles of a first image source traveling along a first optical path;
(ii) a second image source and optics train including lenses for projecting light ray bundles of a second, different image source traveling along a second optical path;
(iii) a common lens shared between said first and second optics trains and positioned to receive said image-bearing light ray bundles traveling downstream from said first and second optics trains; and
(iv) a partially reflective projection surface for reflecting the images from the common lens to the wearer while allowing the wearer to see through the projection surface.

18. The helmet mounted display according to claim 17, wherein said common lens is positioned and oriented to impart changes to the optical properties of the two crossing light ray bundles in a manner which allows the reorientation, repositioning and/or resizing of upstream optical elements.

19. The helmet mounted display according to claim 17, further comprising more than two optics trains generating more than two light ray bundles traveling along corresponding optical paths, said common lens being shared between the more than two optics trains.

20. The helmet mounted display according to claim 17, further comprising an adjustment mechanism connected to said common lens for enabling adjustment of an image impact point on the helmet projection surface.

21. The helmet mounted display according to claim 20, wherein the helmet projection surface includes a combiner.

22. The helmet mounted display according to claim 20, wherein the helmet projection surface is a helmet visor.

23. The helmet mounted display according to claim 22, wherein the visor includes a combiner.

24. The helmet mounted display according to claim 17, wherein the helmet projection surface includes a combiner.

25. The helmet mounted display according to claim 17, wherein the helmet projection surface is a helmet visor.

26. The helmet mounted display according to claim 25, wherein the visor includes a combiner.

27. The helmet mounted display according to claim 17, wherein said common lens includes more than one optical element.

28. The helmet mounted display according to claim 27, wherein said helmet projection surface includes a combiner.

29. The helmet mounted display according to claim 27, wherein said helmet projection surface is a helmet visor.

30. The helmet mounted display according to claim 29, wherein the visor includes a combiner.

* * * * *

UNITED STATES PATENT AND TRADEMARK OFFICE
CERTIFICATE OF CORRECTION

| | |
|---|---|
| PATENT NO. | : 7,375,894 B2 |
| APPLICATION NO. | : 11/370088 |
| DATED | : May 20, 2008 |
| INVENTOR(S) | : Todd Ashcraft, Kenneth Scott Ellis and Richard Nicholas Pfisterer |

It is certified that error appears in the above-identified patent and that said Letters Patent is hereby corrected as shown below:

(Column 6, Line 65, Claim 1) - Delete "in" and replace with --on--

(Column 7, Line 44, Claim 17) - Delete "in" and replace with --on--

Signed and Sealed this

Twenty-ninth Day of July, 2008

JON W. DUDAS
*Director of the United States Patent and Trademark Office*